United States Patent
Couchman et al.

(10) Patent No.: US 9,018,782 B2
(45) Date of Patent: Apr. 28, 2015

(54) OVER-RATING CONTROL IN WIND TURBINES AND WIND POWER PLANTS

(75) Inventors: Ian Couchman, London (GB); Christopher Spruce, Leatherhead (GB); Judith Turner, Dorking (GB); Martin Evans, London (GB); Robert Bowyer, London (GB)

(73) Assignee: Vestas Wind Systems A/S, Aarhus N (DK)

( * ) Notice: Subject to any disclaimer, the term of this patent is extended or adjusted under 35 U.S.C. 154(b) by 6 days.

(21) Appl. No.: 13/876,068

(22) PCT Filed: Sep. 30, 2011

(86) PCT No.: PCT/DK2011/050366
§ 371 (c)(1),
(2), (4) Date: Apr. 15, 2013

(87) PCT Pub. No.: WO2012/041326
PCT Pub. Date: Apr. 5, 2012

(65) Prior Publication Data
US 2013/0270827 A1    Oct. 17, 2013

Related U.S. Application Data

(60) Provisional application No. 61/388,309, filed on Sep. 30, 2010.

(30) Foreign Application Priority Data

Sep. 30, 2010  (GB) .................................. 1016493.7

(51) Int. Cl.
*F03D 9/00*    (2006.01)
*H02P 9/04*    (2006.01)
(Continued)

(52) U.S. Cl.
CPC  *H02P 9/02* (2013.01); *F03D 7/028* (2013.01); *F03D 7/042* (2013.01);
(Continued)

(58) Field of Classification Search
CPC ... Y02E 10/723; Y02E 10/563; Y02E 10/763; H02J 4/00; H02J 3/28; H02J 3/36; H02J 3/386; H02J 3/40; F05B 2270/1033; F05B 2260/821; H02P 2290/004; H02P 9/305; Y04S 20/221; G05B 13/02
USPC ...................................................... 290/44, 55
See application file for complete search history.

(56) References Cited

U.S. PATENT DOCUMENTS 4,200,833 A    4/1980    Wilkerson ..................... 323/283
4,242,628 A    12/1980   Mohan et al. .................. 322/35
(Continued)

FOREIGN PATENT DOCUMENTS

EP    1571746 A1    9/2005
EP    2249029 A2    11/2010
(Continued)

OTHER PUBLICATIONS

Search Report for GB1016493.7, Feb. 8, 2011.
(Continued)

*Primary Examiner* — Pedro J Cuevas
(74) *Attorney, Agent, or Firm* — Patterson & Sheridan LLP

(57) ABSTRACT

Wind turbines of a wind power plant may be selectively over-rated by measuring the difference between the nominal and actual power plant outputs and deriving an over-rating request signal based on that difference which is sent to each turbine. The same value may be sent to each turbine. Alternatively, each turbine may be given its own over-rating amount based on an optimization of the turbine. Over-rating may also be used when external economic factors such as energy costs are sufficiently high to out-weigh any potential harmful effect of over-rating. The fatigue lifetime of turbines and their critical components may also be taken into account when deciding whether and to what extent to implement an over-rating command.

32 Claims, 6 Drawing Sheets

(51) Int. Cl.
*H02P 9/02* (2006.01)
*F03D 7/02* (2006.01)
*F03D 7/04* (2006.01)

(52) U.S. Cl.
CPC ..... *F05B 2240/96* (2013.01); *F05B 2270/1033* (2013.01); *F05B 2270/335* (2013.01); *Y02E 10/723* (2013.01)

(56) References Cited

U.S. PATENT DOCUMENTS

| | | | | |
|---|---|---|---|---|
| 5,171,127 | A * | 12/1992 | Feldman et al. | 416/119 |
| 5,183,386 | A * | 2/1993 | Feldman et al. | 416/119 |
| 6,850,821 | B2 | 2/2005 | Weitkamp | 700/286 |
| 6,950,730 | B1 * | 9/2005 | Bouwhuis | 700/297 |
| 7,414,331 | B2 * | 8/2008 | Datta | 307/71 |
| 7,999,406 | B2 * | 8/2011 | Cardinal et al. | 290/44 |
| 8,112,239 | B2 * | 2/2012 | Elisiussen | 702/113 |
| 8,324,751 | B2 * | 12/2012 | Yasugi et al. | 290/44 |
| 8,332,077 | B2 * | 12/2012 | Kondo et al. | 700/287 |
| 8,380,357 | B2 * | 2/2013 | Garcia Barace et al. | 700/287 |
| 8,441,138 | B2 * | 5/2013 | Gjerlov et al. | 290/44 |
| 8,502,403 | B2 * | 8/2013 | Merswolke et al. | 290/44 |
| 8,674,536 | B2 * | 3/2014 | Eitan et al. | 290/44 |
| 2003/0102675 | A1 | 6/2003 | Noethlichs | 290/44 |
| 2003/0127862 | A1 | 7/2003 | Weitkamp | 290/44 |
| 2005/0225908 | A1 * | 10/2005 | Datta | 361/38 |
| 2006/0273595 | A1 | 12/2006 | Avagliano et al. | 290/44 |
| 2007/0085343 | A1 | 4/2007 | Fortmann | 290/44 |
| 2008/0073912 | A1 | 3/2008 | Fortmann et al. | 290/44 |
| 2009/0259429 | A1 * | 10/2009 | Elisiussen | 702/113 |
| 2010/0133831 | A1 | 6/2010 | Scholte-Wassink et al. | 290/44 |
| 2010/0283245 | A1 * | 11/2010 | Gjerlov et al. | 290/44 |
| 2010/0283246 | A1 * | 11/2010 | Christensen | 290/44 |
| 2011/0033291 | A1 * | 2/2011 | Moore et al. | 416/1 |
| 2011/0049903 | A1 * | 3/2011 | Jorgensen et al. | 290/55 |
| 2011/0133453 | A1 * | 6/2011 | Merswolke et al. | 290/44 |
| 2012/0056602 | A1 * | 3/2012 | Li et al. | 322/89 |
| 2012/0061960 | A1 * | 3/2012 | Yasugi et al. | 290/44 |
| 2012/0205981 | A1 * | 8/2012 | Varma et al. | 307/64 |
| 2013/0134709 | A1 * | 5/2013 | Eitan et al. | 290/44 |
| 2013/0204443 | A1 | 8/2013 | Steven et al. | 700/286 |
| 2013/0257051 | A1 * | 10/2013 | Spruce et al. | 290/44 |
| 2013/0313828 | A1 * | 11/2013 | Moreau et al. | 290/44 |
| 2014/0054893 | A1 * | 2/2014 | Lindholdt et al. | 290/44 |
| 2014/0203563 | A1 * | 7/2014 | Bowyer et al. | 290/44 |
| 2014/0248123 | A1 * | 9/2014 | Turner et al. | 415/1 |

FOREIGN PATENT DOCUMENTS

| | | |
|---|---|---|
| EP | 2249030 A2 | 11/2010 |
| EP | 2416007 A2 | 2/2012 |
| WO | 2010/086032 A2 | 8/2010 |
| WO | 2011/157271 A2 | 12/2011 |
| WO | 2011/160634 A1 | 12/2011 |

OTHER PUBLICATIONS

International Search Report, PCT/DK2011/050366, Apr. 24, 2012.
Siemens; "Increasing of maximum load level", Dec. 31, 2006, p. 1, XP007920503.
European Examination Report for Application No. 11770684.6, Jul. 8, 2014.

* cited by examiner

OVER-RATING CONTROL IN WIND TURBINES AND WIND POWER PLANTS

This invention relates to over-rating control in wind turbines and wind power plants and, in particular to control methods and apparatus which enable one or more wind turbines of a plant to generate power at above rated output in dependence on a variety of factors.

The rated power of a wind turbine is defined in IEC 61400 as the maximum continuous electrical power output which a wind turbine is designed to achieve under normal operating and external conditions. Large commercial wind turbines are generally designed for a lifetime of 20 years and their rated power output takes into account that lifespan.

Wind turbines are commonly operated as part of a wind power plant comprising a plurality of wind turbines. U.S. Pat. No. 6,724,097 discloses operation of such a wind plant. The output of each turbine is determined and one or more turbines controlled so that the output power of one or more turbines is reduced if the total output exceeds the rated output of the plant. Such an arrangement is useful as the sum of the individual rated powers may exceed the rated output of the wind power plant, but at any one time, not all turbines may be operating at full capacity; some may be shut down for maintenance and some may be experiencing less than ideal wind conditions.

While the approach taken in U.S. Pat. No. 6,724,097 deals with avoiding overproduction by a wind power plant, the total output of the plant may not reach the rated plant power if some turbines are shut down, for example for maintenance, or are not operating at their rated power, for example because the local wind conditions at those turbines do not allow rated power output to be achieved. It is economically desirable, therefore, to boost the output of one or more of the turbines to increase the total output of the power plant to its rated output. However, such boosting risks damaging the turbines.

U.S. Pat. No. 6,850,821 discloses a wind turbine controller that has measured stress conditions as an input allowing it to control the output power as a function of measured stress. Thus, for example, power output may be reduced in very turbulent wind conditions in comparison to less turbulent conditions having the same average wind speed. US-A-2006/0273595 discloses intermittently operating a wind power plant at an increased rated power output based on an assessment of operating parameters with respect to component design ratings and intermittently increasing the output power of a wind turbine based on the assessment. The present invention aims to provide improved methods and apparatus for enabling wind turbines to operate at above rated power.

According to the invention, there is provided a controller for a wind turbine power plant, the power plant comprising a plurality of wind turbines each having a rated power output, the controller comprising an over-rating calculation unit for calculating and sending to two or more of the turbines an over-rating request signal indicating an amount up to which the turbines are to over-rate their output above their rated output.

The invention also provides a method of controlling a wind turbine power plant, the plant comprising a plurality of wind turbines each having a rated output, the method comprising deriving an over-rating request signal indicating an amount up to which two or more of the turbines are to over-rate their output above rated output, and sending the over-rating request signal to each turbine.

Embodiments of the invention have the advantage that, within the rated output of a wind power plant, some or all of the turbines may be operated at above rated power depending on conditions. This enables the power plant operating to have more flexibility to react to demands from the grid, meteorological conditions and other external variables.

Preferably, the over-rating amount is a set point calculated by the controller from a difference signal formed from the rated output of the power plant less the measured output of the power plant. This enables the controller to calculate an over-rating signal that may be sent to some or all of the turbines.

Preferably, the difference signal is integrated and amplified by applying a gain and the amplified integrated signal is provided to the controller to derive the over-rating request signal.

Preferably, the gain applied by the amplifier is inversely proportioned to the ratio of the change in over-rating set point to power plant output change, the ratio being provided from the plurality of wind turbines. This has the advantage that an upper bound on the ratio does not need to be used which improves the response time of the controller.

Preferably, the gain of the amplifier is dependent on the delay in signalling between the controller and individual wind turbines. This assists in avoiding instability in the outputs of the wind turbines.

Preferably, an individual over-rating request signal is calculated for one or more of the plurality of wind turbines based on an individual over-rating capability provided to the controller by the plurality of wind turbines. This approach provides an alternative to over-rating based on feedback and enables an individual over-rating to be calculated for each wind turbine based on the status of that turbine.

The over-rating signal request provided to each turbine may be processed by each turbine to take into account turbine fatigue. This enables turbines to react to a global over-rating command in a manner which reflects the condition of the individual wind turbine.

Preferably, that fatigue is the fatigue of critical components with respect to rotational speed and/or torque as the product of these two variables is the power, the set point for which comprises the over-rating request signal from the controller. The turbines may, in response to turbine fatigue, implement the over-rating request signal by less than the full amount or not at all. The processing of the over-rating command may be according to a response function based on slope or offset control.

Preferably, the over-rating set point is converted by a turbine optimiser into a rotational speed and torque signal on the basis of a defined maximum and minimum permissible speed and torque. The set point is a power set point. Where this power set point is outside an area bounded by these maxima and minima the speed and torque are set to the maximum or minimum permissible.

The invention also resides in a wind turbine power plant having a controller as defined above. The optimiser may be a central optimiser which calculates speed and torque set points for a plurality of turbines or may an individual turbine optimiser which calculates speed and torque set points for an individual turbine.

Embodiments of the invention will now be described, by way of example only, and with reference to the accompanying drawings, in which.

Figure 10:
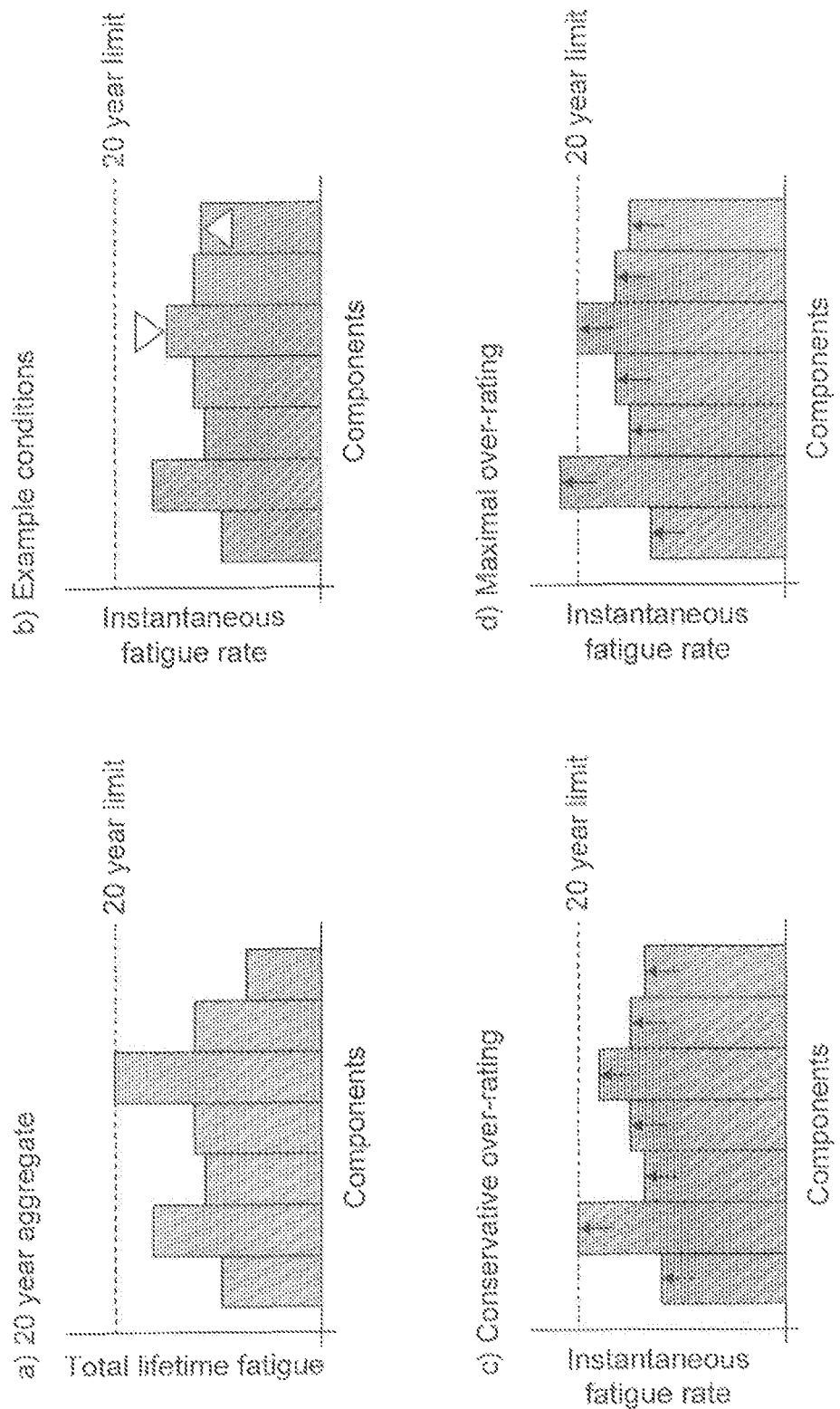
Figure 11:
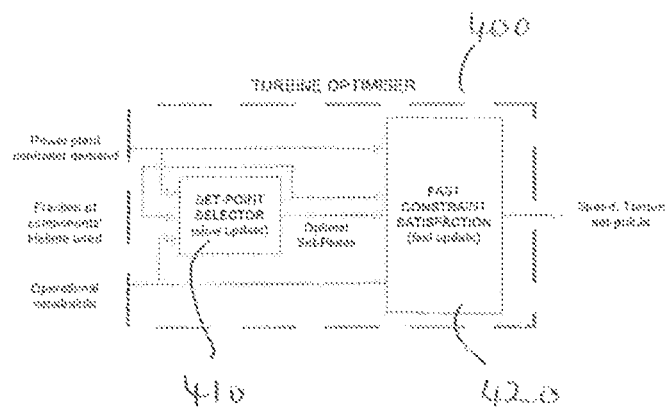

FIG. 10a)-d) illustrate the relationship between fatigue and overrating;

FIG. 11 illustrates a turbine optimiser; and

Figure 12:
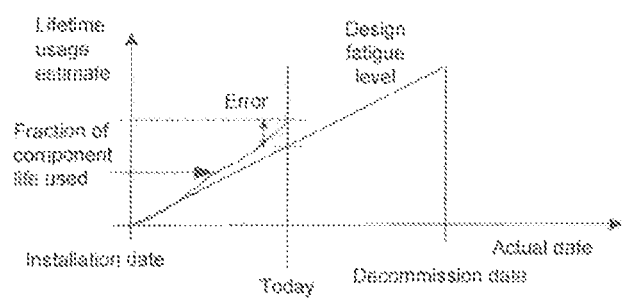

FIG. 12 illustrates how overrating is prevented when the lifetime usage of a component exceeds its design limit at a given component age The following description addresses the general control of turbines in a wind turbine power plant, the control of output power from those turbines, and the optimisation of operating parameters such as speed and torque within individual turbines based on set points provided from the power plant controller. It describes control regimes which are both devised by a multi-turbine controller and sent as commands to individual turbines, and control regimes which are implemented by individual turbines and then communicated to a multi-turbine controller such as a power plant controller.

Figure 1:
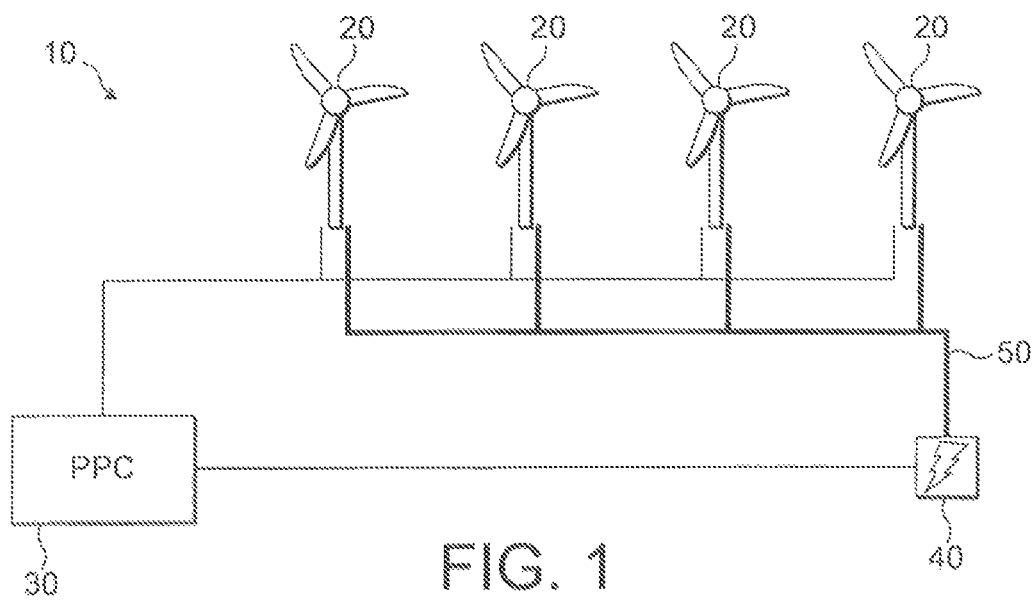
FIG. 1 is a schematic view of a known wind power plant control regime using a power plant controller.

FIG. 1 shows, schematically, a conventional wind power plant 10 comprising a plurality of wind turbines 20 each of which communicates with a power plant controller PPC 30. The PPC 30 can communicate bi-directionally with each turbine. The turbines output power to a grid connection point 40 as illustrated by the thick line 50.

In operation, and assuming that wind conditions permit, each of the wind turbines 20 will output maximum active power up to their nominal set point. This is their rated power as specified by the manufacturer. The power that is output to the grid connection point is simply the sum of the outputs of each of the turbines.

Figure 2:
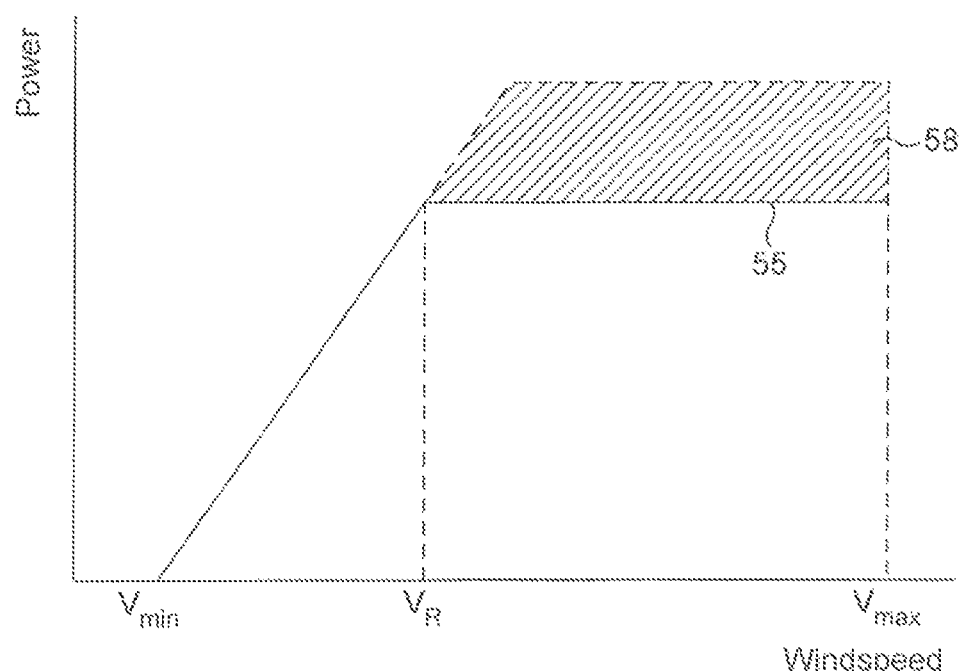
FIG. 2 is a graph of wind speed against power showing a power curve for a typical wind turbine.

FIG. 2 illustrates a conventional power curve 55 of a wind turbine plotting wind speed on the x axis against power output on the y axis. Curve 55 is the normal power curve for the wind turbine and defines the power output by the wind turbine generator as a function of wind speed. As is well known in the art, the wind turbine starts to generate power at a cut in wind speed Vmin. The turbine then operates under part load (also known as partial load) conditions until the rated wind speed is reached at point Vr. At the rated wind speed at point Vr the rated (or nominal) generator power is reached and the turbine is operating under full load. The cut in wind speed in a typical wind turbine is 3 m/s and the rated wind speed is 12 m/s. Point Vmax is the cut out wind speed which is the highest wind speed at which the wind turbine may be operated while delivering power. At wind speeds equal to and above the cut out wind speed the wind turbine is shut down for safety reasons, in particular to reduce the loads acting on the wind turbine.

As described above, the rated power of a wind turbine is defined in IEC 61400 as the maximum continuous electrical power output which a wind turbine is designed to achieve under normal operating and external conditions. Therefore, a conventional wind turbine is designed to operate at the rated power so that the design loads of components are not exceeded and that the fatigue life of components is not exceeded.

As shown in FIG. 2, in embodiments of the invention the turbine is controlled such that it can produce more power than the rated power as indicated by shaded area 58. The term "over-rating" is understood to mean producing more than the rated active power during full load operation. When the turbine is over-rated, the turbine is run more aggressive than normal and the generator has a power output which is higher than the rated power for a given wind speed.

The over-rating is characterised by a transient behaviour. When a turbine is over-rated it may be for as short as a few seconds, or for an extended period of time if the wind conditions and the fatigue life of the components are favourable to over-rating.

The over-rating power level may be up to 30% above the rated power output.

The PPC controller 30 is shown schematically for ease of illustration. It communicates with each of the turbines and can receive data from the turbines, such as pitch angle, rotor speed, power output etc. and can send commands to individual turbines, such as set points for pitch angle, rotor speed, power output etc. The PPC 30 also receives commands from the grid, for example from the grid operator to boost or reduce active or reactive power output in response to demand or a fault on the grid. Although not shown in the schematic figure, each wind turbine also has its own controller which is responsible for operation of the turbine and communicates with the PPC 30.

The PPC controller 30 receives power output data from each of the turbines and is therefore aware of the active and reactive power output by each turbine and by the plant as a whole at the grid connection point 40. If required, the PPC controller 30 can receive an operating set point for the power plant as a whole and divide this among each of the turbines so that the output does not exceed the operator assigned set point. This power plant set point may be anywhere from 0 up to the rated power output for the plant. The "rated power" or "nominal power" output for the plant is the sum of the rated power output of the individual turbines in the plant. The power plant set point may even be above the rated power output of the plant, i.e. the whole plant is over-rated. This is discussed further below.

Figure 3:
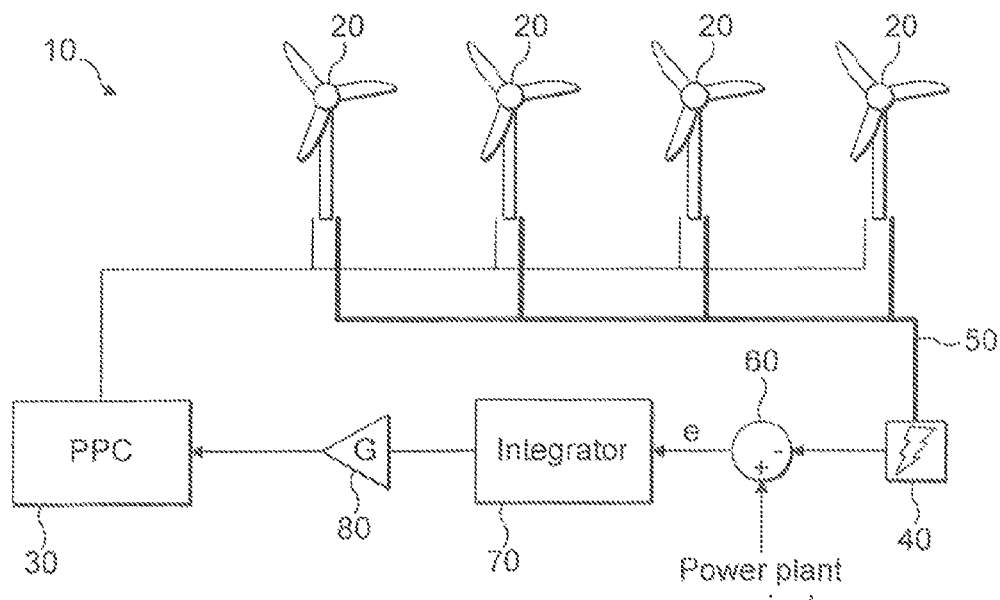
FIG. 3 is a schematic view of a wind power plant control regime embodying the present invention.

FIG. 3 shows a first embodiment of the invention. Instead of receiving an input directly from the grid connection, the power plant controller 30 receives a signal which is a measure of the difference between the total power plant output and the nominal power plant output. This difference is used to provide the basis for over-rating by individual turbines. In this embodiment, which is only one example, the actual output of the power park is subtracted from the nominal or rated output of the power park at subtractor 60. The difference, shown as error signal e in FIG. 3 is input to an integrator 70. The integrator includes in-built saturation which prevents integral wind up which is a well-known problem in controllers where a large change in set point occurs and the integral terms accumulate a significant error during the rise (wind up), thus overshooting and continuing to increase as this accumulated error is offset by errors in the other direction (unwound).

The output from integrator 70 is input to an amplifier 80 which applies a fixed gain G which scales the integrator output to provide an over-rating amount which is then provided to the controller 30 and sent by the controller to each of the turbines 20. In theory, only a single turbine may be over-rated, but it is preferred to over-rate a plurality of the turbines, and most preferred to send the over-rating signal to all the turbines. The over-rating signal sent to each turbine is not a fixed control but an indication of a maximum amount of over-rating that each turbine may perform. Each turbine has an optimiser, which may be located at the turbine or centrally, and which is described in detail below, which will determine whether the turbine can respond to the over-rating signal and, if so, by what amount. For example, where the optimiser determines that conditions at a given turbine are favourable and above rated wind speed it may respond positively and the given turbine is over-rated. As the optimisers implement the over-rating signal, the output of the power plant will rise and so the error signal produced by the subtractor 60 will decrease. The integrator will reach equilibrium as the error either reaches zero or the integrator saturates.

Thus, in this embodiment an over-rating signal is generated. This signal is indicative of the amount of over-rating that may be performed by turbines of the power plant as a whole. However, each turbine responds individually to the over-rating signal in accordance with its optimiser. If conditions are such that the total optimisation results in over-rating that threatens to exceed the power plant nominal output, the difference will reduce and individual optimisers will reduce the amount of over-rating applied.

Figure 4:
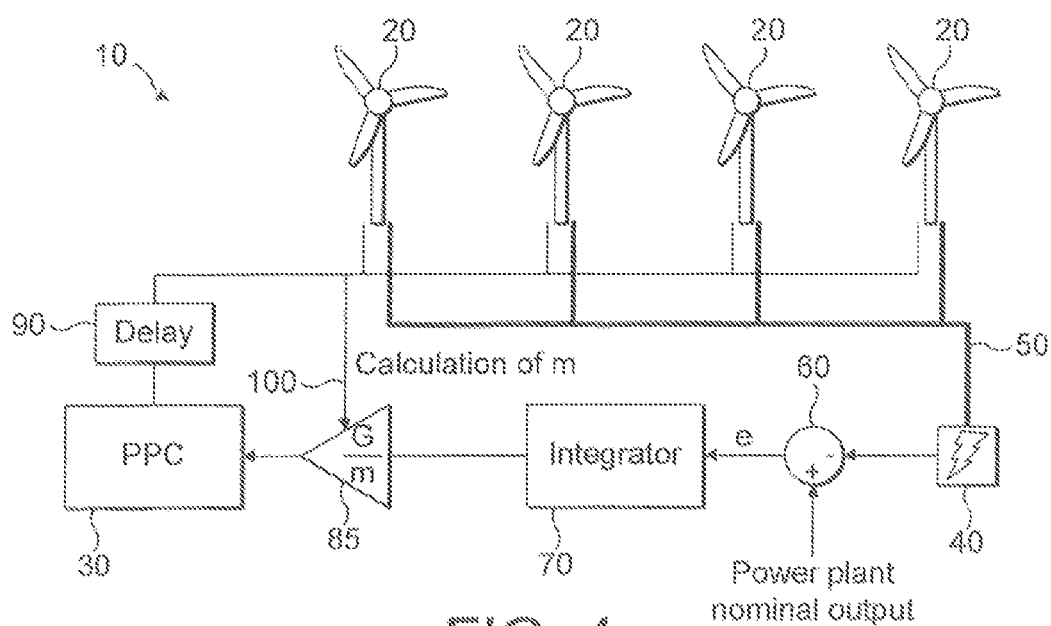
FIG. 4 is a similar view to FIG. 3 showing a refinement of the control regime.

FIG. 4 shows a modification of the arrangement of FIG. 3. The FIG. 4 arrangement takes into account communications delays which may occur in a real power plant between the PPC 30 and the turbines 20. This is important as the over-rating signal is communicated from PPC 30 to the turbines 20. If the value tmG is too large, where t is delay time, m is the ratio of change in over-rating request to power plant output change and G is the basic feedback gain, the system will overshoot, oscillate or become unstable. This value is a measure of the time taken for the turbines to react to over-rating commands from the PPC 30. To ensure that tmG is maintained within an acceptable range an upper bound may be placed on t and m when calculating the maximum feedback gain. However, this approach makes the controller slow to respond to changes in power plant output. This is undesirable when the output is too low and is unacceptable when the output is too high as such operation could lead to component damage.

The arrangement of FIG. 4 overcomes this problem. The individual turbines are interrogated via their respective controllers by the PPC 30 to calculate the value of m. The arrangement of FIG. 4 is similar to FIG. 3 except that the gain of amplifier 85 is expressed as G/m and an input 100 from the turbines to the amplifier is shown. The delay between the PPC 30 and the turbines 20 is illustrated as delay 90. Thus the only parameter that is determined from the upper bound is t. This approach enables the controller to respond more quickly to changes in power plant output.

In this example, as with the FIG. 3 example, the over-rating command sent to each turbine is the same.

It will be appreciated that the basic approach of FIG. 3 may be used where the delay between the controller 30 and the turbines is negligible. In practice, the delay will be determined by a number of factors but the proximity of the PPC 30 to the turbines will play a large part in determining the delay. At present a PPC can poll all turbines in a large power plant in about 20 seconds but it is anticipated that this time will reduce to less than 1 second or even 10 s of milliseconds in the near future.

Figure 5:
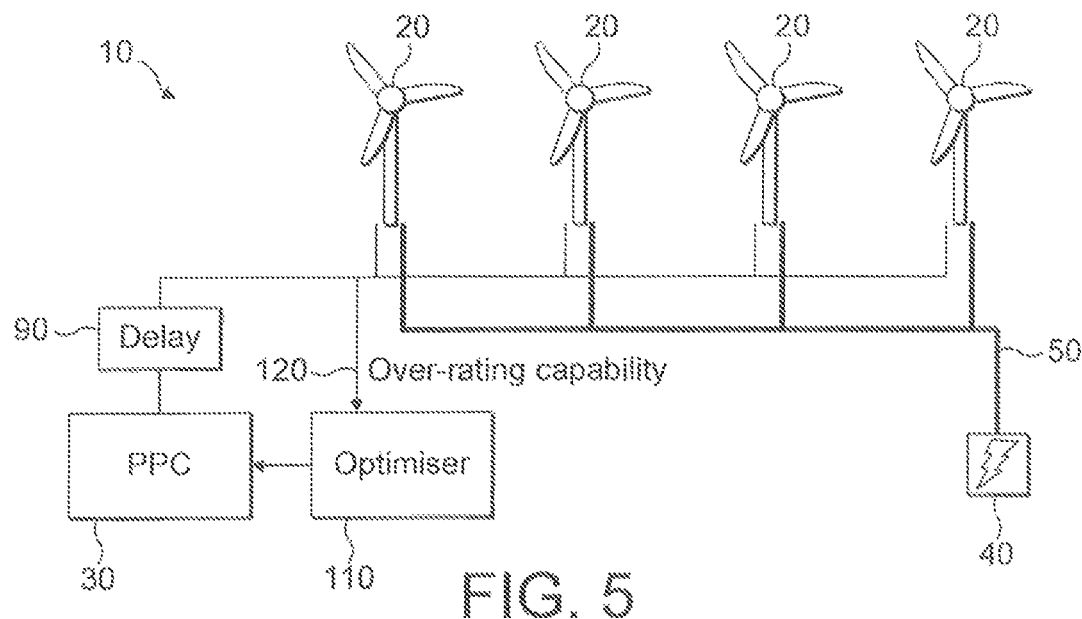
FIG. 5 is a similar view to FIG. 3 showing a further refinement of the control regime.

In the previous two examples, the same over-rating set point signal is sent to each turbine using the total power plant output to provide a control input. In the embodiment of FIG. 5, each turbine is given its own over-rating amount. Thus in FIG. 5 a central optimiser 110 provides an input into the PPC 30. The central optimiser 110 receives an input 120 from each turbine which indicates the over-rating capability of that turbine. That input will depend on a variety of factors such as the local wind conditions, the present cost of electricity generated and the age or fatigue damage of the turbine and will be provided by the individual turbine controller. The central optimiser 110 will calculate an over-rating value for each turbine and communicate that value to each turbine based on the present over-rating capability of the turbine. Of course the PPC 30 will take other factors into account, such as the need to ensure that the total power output does not exceed the rated output for the power plant. The optimiser will base its decisions on the effect of its actions on the fatigue damage of the turbine components and, in FIG. 5, this is performed centrally for all turbines.

Thus FIGS. 3 to 5 illustrate ways in which the over-rating of each turbine may be implemented via a power plant controller either by generating a common over-rating command for each turbine or by generating an individual over-rating command for each turbine.

Figure 6:
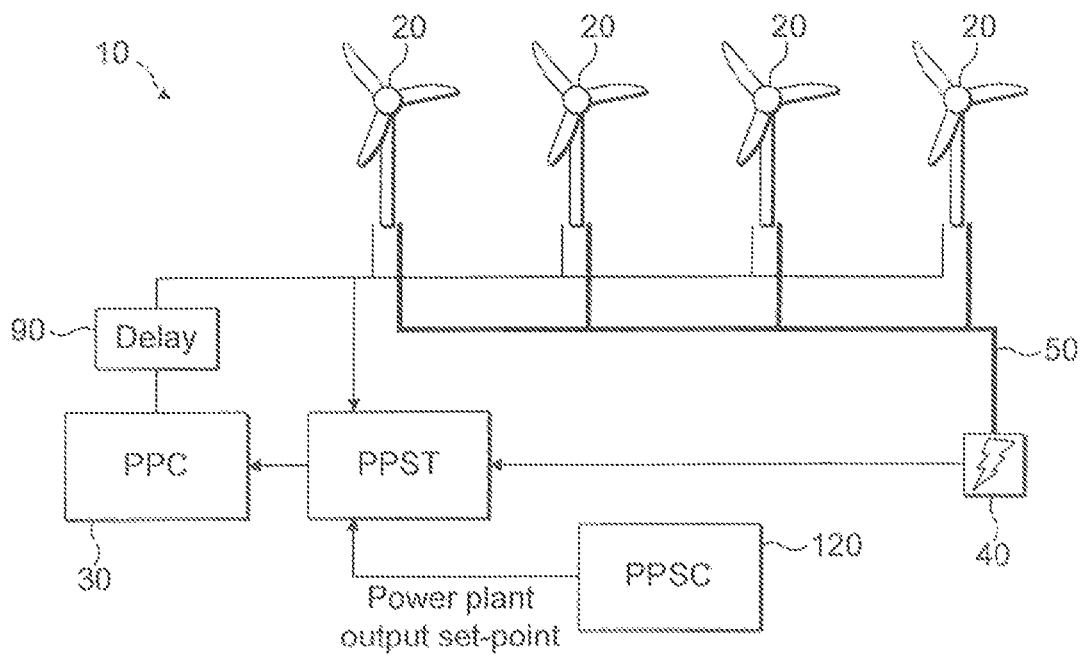
FIG. 6 is a schematic view of a power plant set point controller.

The examples given above each enable the power plant output set point to be tracked, which in turn makes it possible to vary that power plant set point. FIG. 6 illustrates an additional, optional level of control for controlling this power plant set point. This controller introduces a power plant setpoint controller PPSC which produces set points based either on the value of power that can be generated which will depend, for example, on the time of day and year, or on some other external variable such as the age of the turbine or the need for the turbine operator to generate cash flow In this example, each turbine may control its own fatigue life through an individual turbine optimiser or control of fatigue may be through a central optimiser as in the example of FIG. 5. In FIG. 6, PPST is a power plant set point tracker and corresponds to the optimiser of FIG. 5.

In a first variant of the FIG. 6 embodiment, the power plant output set point is manually moved, or scheduled to move depending on the date. Over the course of a year, a number of set point changes may be scheduled. The purpose of this is to benefit from feed-in tariffs or power purchase agreements and aids the power plant operator's net present value. In addition to seasonal variations, day-night variations in set points may be scheduled to take into account higher day time electricity prices. These are examples only and more advanced variations in electricity prices may be scheduled in a similar manner to help the power park operator maximise their return from the turbines.

As well as daily fluctuations in electricity prices there are slower prices observed due to wider market effects such as the prices of raw materials such as oil and gas. Merely scheduling changes in power plant operating set points does not take these changes into account as they are not cyclical or necessarily predictable. Instead, the real time price of electricity on the spot market for the geographical area to be supplied by the power plant can provide an additional or an alternative input to the controller. Thus the power set point is higher when the oil or gas price is above a threshold value and lower when the oil or gas price falls below that threshold. The turbines are commanded to over-rate if their local controllers will permit it when the set point is higher so that the power plant operator can benefit from the higher prices in the spot market. It is likely that this approach will have no overall effect on fatigue lifetimes as the median point for the set point is chosen such that the turbines will spend as much time at the higher set point as at the lower set point.

In addition or alternately to control based on spot market prices, the controller may take into account the cost of electricity being traded on the forwards markets which give a strong indication of the likely price of electricity some hours, days or even weeks in the future. These markets are partially driven by load forecasting which takes into account, for example, expected weather conditions and may be used as an input to the controller to assist in reaching the optimal set-point to control.

In the embodiments described, the output of turbines is over-rated as the total output of the power plant is below the nominal output of the plant. This could be for a variety of reasons. For example, if the total rated output of all turbines is equal to the rated output of the power plant, over-rating may be used if some turbines are shut down for maintenance or are not operating at rated power, for example because the local wind conditions do not permit it.

Alternatively, the power plant may be designed to have a rated power output that is higher than the sum of the rated outputs of all the turbines. This is advantageous as over-rating may then be used even when all turbines are at rated output. This enables the plant operator easily to take advantage of changes in operating tariffs as described above. The approach outlined above with respect to FIG. 6 enables the power plant operator to benefit from favourable market conditions and tariffs by using over-rating and so boosting income generated from the power plant. The operator may choose to use this embodiment of the invention to over-rate at any time when additional revenue is required, even if the market data or the tariffs are not particularly favourable at the time. The embodiment gives the operator the ability to generate additional cash-flow which may be required for a variety of business reasons.

Figure 7:
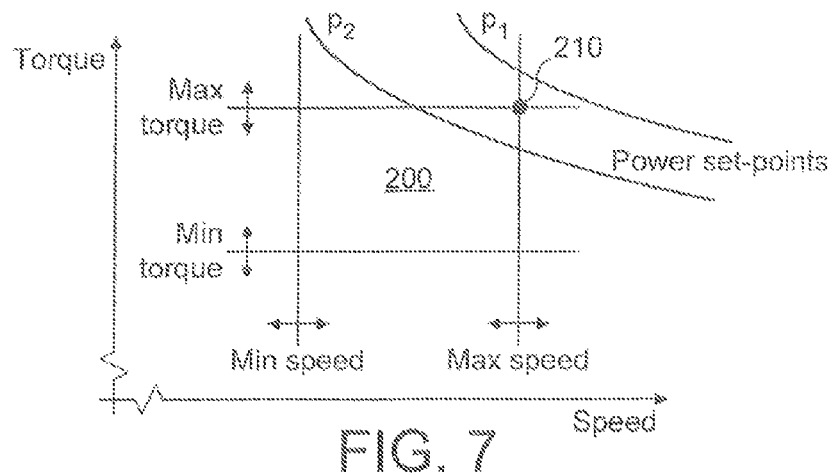
FIG. 7 is a graph of torque against speed showing operating constraints for a wind turbine.
Figure 8:
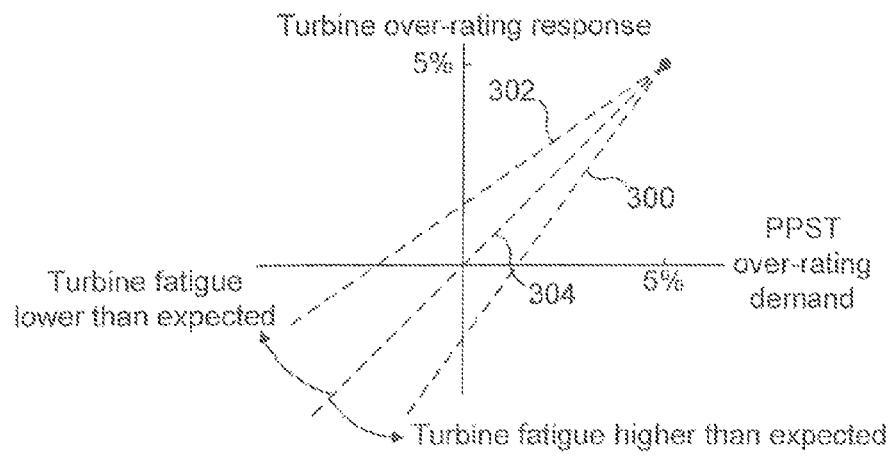
FIG. 8 is a graph illustrating the use of slope control in over-rating.
Figure 9:
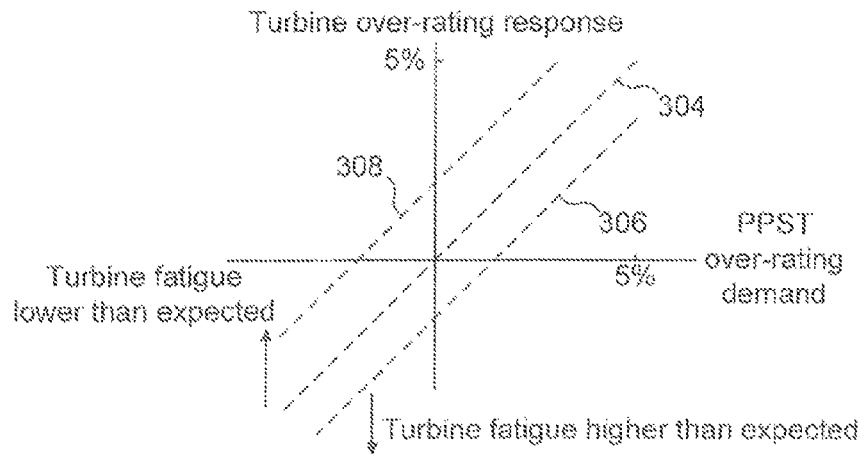
FIG. 9 is a graph illustrating the use of offset control in over-rating.

The embodiment described with respect to FIGS. 3 to 6 shows how over-rating can be used to boost the output of individual turbines in response to a detected shortfall in power plant output or in response to external economic conditions. FIGS. 7-9 are concerned with the actual optimisation of turbines for over-rating operation, and show how the over-rating command may be implemented.

FIG. 7 is a graph of generator torque against generator rotational speed for a wind turbine. Curves $P_1$ and $P_2$ are lines of constant power corresponding to power set-points $P_1$, $P_2$. They are curved as power is the product of torque and rotational speed. An over-rating command from the PPC 30 takes the form of a shift in the power set-point to a new value. The turbine must then select an operating speed and torque to deliver that power.

A turbine has hard constraints defined as the maximum and minimum torque and speed at which it can operate. These constraints are imposed by the controller and dictated by factors such as noise limits, gearbox lubrication, component lifetime etc. These constraints are referred to as hard constraints as the controller may not violate them except in the extreme case of performing a shutdown. Although these constraints are rigid, they may vary over time.

The controller may also impose soft constraints which are intended to prevent the turbine shutting down during overrating, typically as thermal limits or maximum generator speed are approached. A temperature increase in key components will occur during overrating, for example throughout the drive train, and could trip shutdown. Soft constraints may be lower than hard constraints but result in the controller reducing the amount of overrating rather than performing a shut down. Thus the turbine optimiser may include soft constraint values for drive train related parameters and generator speed. When the controller detects that a measured value is approaching a soft constraint value the over-rating signal is reduced.

Thus, referring to FIG. 7, on the graph of Torque against Rotational Speed there is a box 200 within which the turbine can operate. The box is bounded by maximum and minimum speed and torque. The purpose of the turbine optimiser is to choose the optimum operating point for the turbine. In FIG. 5 the optimiser is shown as a central unit which performs calculations for a plurality of turbines, possibly all turbines of the power plant. This need not be the case and the optimiser can be performed on a computer physically located at a turbine, for example, as part of the existing turbine controller. In that case, the data is passed over the communications link to the PPC 30. The term 'turbine optimiser' therefore refers to the selection of set points for a given turbine rather than implying any location.

It can be seen from FIG. 7 that the turbine cannot achieve operation at any point on constant power curve $P_1$, which is, at all times outside the box 200. In this case, if the PPC 30 requests a power set point $P_1$ at a given turbine, the turbine optimiser will select the optimal rotational speed and torque at the top right hand corner 210 of the box. If the PPC 30 requests a power set point P2 at a given turbine, the line of constant power $P_2$ passes through the box, and so any point on that part of the line that passes through the box could be chosen as the operating point. The purpose of the turbine optimiser is to choose the best point along this part of the curve. Although the figure shows generator rotational speed, the term rotational speed may refer to the rotational speed of the generator, the rotor or the speed anywhere along the drive train. Although the absolute values are different, they are all related.

Although not shown in the figure, if a constant power curve were to go completely below the box 200 there are two available choices. Firstly, the turbine shuts down as any setpoints within the box would produce a power output above the power set point. Secondly, the turbine sets the rotational speed and torque as the bottom left corner of the box 200, by analogy to the case with curve $P_1$, and advises the power plant controller 30 that it is running above the requested power set point. The PPC 30 can then optimise the scenario by lowering the set-points for one or more other turbines. However, if all turbines, or a substantial percentage, were in the bottom left corner, at least some would have to be shut down.

Any point inside box 200 on the power set-point line is valid. The following section describes how the set-point (or line of constant power) is chosen having regard to the fatigue lifetime of the turbine and components of the turbine.

The description above with respect to FIGS. 3 to 5 explained how a common over-rating signal or set point sent from the PPC 30 is used to control over-rating by all turbines to control the overall power plant output. However, over-rating carries inherent risks, particularly to the integrity of turbine components and it is important to control the extent to which over-rating is used over the lifetime of a turbine. One way in which this may be achieved is for each turbine to respond to the common over-rating signal or set point in a way that best suits itself. This calculation or assessment may be made either at the individual turbines as part of their central process, or at the PPC 30 which may perform the calculation individually for multiple turbines based as data received from those turbines.

Thus, when the over-rating demand is received at each turbine from the PPC 30, each turbine processes and responds to this signal taking fatigue into account. A turbine may not over-rate or may not over-rate at the level requested if the effect on the fatigue lifetime of critical components is too great. Examples of critical components include the rotor blades, blade pitch systems, main bearing, gearbox, generator, converter, transformer, yaw system, tower and foundations. This will depend on the conditions at the turbine as well as the lifetime history of the turbine. For example, a turbine that is near the end of its life expectancy may be highly fatigued and so not suited to run at the over-rating level demanded. If the power plant output is insufficient as some or all of the turbines are operating under the demanded overrating level for fatigue saving, the over-rating demand will keep rising until it reaches its set-point or saturates.

Where a feedback system is used, such as in FIGS. 3 and 4, each turbine can vary its over-rating response according to lifetime usage. The over-rating set point sent from PPC 30 is processed through a response function, examples of which are described below in FIGS. 8 and 9. In these figures the turbine over-rating response is shown on the Y axis and the selected response is then sent to the system that chooses rotational speed and torque as described in the previous section. Thus, in the graph of FIG. 8, a slope control approach is adapted. Here the controller has issued a 5% over-rating demand to the turbines. Ideally, the turbine will respond with a 5% over-rating. If the output stabiliser, which forms part of the controller requires so, the turbine may respond with the 5% over-rating, overriding fatigue issues. A highly fatigued turbine will de-rate when the request is zero or to slightly over-rate as shown in dashed line 300 in FIG. 8. Low fatigued turbines may over-rate even when the over-rating request from the controller is zero as shown by dashed line 302 in FIG. 8. The slope of these lines may vary according to the degree of fatigue that has been experienced by the turbine and will affect the value of m, the ratio of change in over-rating request to power plant output change described with reference to FIG. 4 above.

In FIG. 8, the dashed line 304 passing through the origin represents a 1:1 ratio of response to demand that would be provided by a turbine with an expected degree of fatigue.

FIG. 9 shows an alternative approach although it is stressed that FIGS. 8 and 9 only show two of a large number of possible approaches. In FIG. 9, the axes are the same as in FIG. 8 and dashed line 304 also represents a 1:1 response from a turbine with expected fatigue. However, in this case, as shown by dashed line 306, if the turbine is sufficiently highly fatigued it will never over-rate as the function will drop below the X axis completely. Similarly, if the fatigue is sufficiently low, the turbine will always over-rate. There will be no rapid changes in the responses as the plant demand changes as the slope is constant.

In the description of FIG. 7, the application of hard constraints to the speed and torque set points was described. These fatigue control soft constraints may be applied before the hard constraints. Thus, the choice of set point within the box 200 of FIG. 7 is affected by the fatigue or lifetime usage information.

When assessing fatigue of different components of the wind turbines, different components will fatigue at different rates under various conditions. Some component's fatigue life will be more sensitive to speed and others will be more sensitive to torque. The turbine components can be split into speed sensitive components and torque sensitive components and the slope and/or position of the line for the two response functions of FIGS. 8 and 9 is then chosen according to the worst of each group.

In order to make operation at above rated power less damaging and have less fatigue damage, the critical components when considering speed and torque related fatigue damage may be upgraded. For example, if it is established that the gearbox is the critical fatigue related component, the gearbox may be upgraded relative to the other components so that the overall fatigue expectancy falls and it becomes more acceptable to over-rate the turbine and the time for which the turbine can be over-rated increases.

Thus, the embodiments of FIGS. 8 and 9 provide for fatigue control within the context of an over-rating system that is based on feedback.

FIG. 5 described an over-rating approach that was based on direct calculation of over-rating amounts rather than feedback based on a difference signal at the power plant output. Fatigue control may be incorporated into this approach. The PPC 30 is responsible for setting the set points for each turbine and also chooses power and torque set points. By using a state-based system, where the states are the accumulated fatigue for each turbine, and the inputs are power or speed and torque set points, as similar control based on fatigue may be achieved as the PPC 30 will be aware of fatigue data communicated from individual turbines which can then be taken into account when setting the power or speed and torque set points.

Thus, embodiments of the invention provide a variety of controllers which enable wind turbines of a power plant to be over-rated. Over-rating may be by a common control provided in response to a measured output that is below the power plant nominal output or it may be by optimisation of individual turbines. Over-rating may additionally, or alternatively, be based on outside economic factors based on the current price of generated power and expected or anticipate changes in that cost. Moreover, when determining the extent to which turbines can be over-rated, the fatigue life of turbine components can be taken into account so enabling the lifetime of the turbine to be preserved and, where appropriate, additional revenue to be generated through over-rating.

The various embodiments described may be combined to provide a system which enables over-rating both to boost output where the power plant is at below nominal output and to take into account external economic factors such as a controller may also incorporate control based on fatigue life-times.

Thus, in the embodiments described, a power plant having a plurality of wind turbines aims to supply the grid with an amount of power agreed upon in advance. The power plant controller manages how much power is extracted from each turbine in order to match the demand. Conventionally, the power demand sent from the PPC to the individual turbines is restricted by their respective nameplate ratings. In the embodiments described, the turbines restrict their own production and the power demand from the PPC is sent to a Turbine Optimizer (TO) on each turbine. This Optimizer is designed to compute and send speed and torque set-points to the Production Controller. The set-point is chosen to maximise the power produced by the turbine across its lifetime whilst keeping the loads within their design limits. The design limits for a turbine are made up of the fatigue and extreme load limits of all the components that make up a turbine. Alternatively, other set-point signals could be sent and in one embodiment of the invention at least one of power, torque and speed set-points are sent.

To ensure the fatigue load limits of all components remain within their design lifetimes, the loads it experiences (be they bending moments, temperatures, forces or motions for example) may be measured and the amount of component fatigue life consumed calculated, for example using a well known technique such as a rainflow count and Miner's rule or a chemical decay equation. The individual turbines can then be operated in such a way as to not exceed the design limits. A device for the measuring of the fatigue life consumed for a given component is referred to as its Lifetime Usage Estimator (LUE). The output from these LUEs can be used in two ways. The LUE can inform the turbine whether the total fatigue experienced at a given point in time is below or above the level the turbine is designed to withstand, and the TO can decide to overrate when the damage is below the expected level. The LUEs can also be used to measure the rate of accumulation of fatigue, as opposed to an absolute level. If the fatigue lives of the components are being consumed quickly, it may be more prudent to not over-rate the turbine even if its current fatigue life is less than expected at that time. The rate of usage of fatigue life may then be one input to the overrating controller and assist in the decision whether or not to overrate.

In practice it is not appropriate to measure all the load signals on all the components and instead LUEs are used for a subset of all the components on the turbine. In order to prevent the components whose lifetime used is not measured with an LUE from reaching their fatigue limits, and also prevent components from exceeding extreme limits, constraints are placed on the turbine operation based upon values of measurable signals (for example temperature or electrical current). These constraints are referred to as operational constraints. Operational constraint controllers (OCCs) define how the turbine's behaviour should be restricted in order to prevent the measured signals from exceeding these operational constraints or triggering alarms which may result in turbine shutdown. For example in the case of an operational constraint on the temperature of a busbar, the operational constraint controller may reduce the power reference sent to the Production Controller by an amount inversely proportional to the difference between the temperature limit and the current measured temperature. Another use for operational constraint controllers could be to restrict the turbine operation based upon the produced noise. This controller would exploit a model of how an operating point translates to a measure of noise.

In order to prevent the component extreme loads from reaching their limits, constraints on the torque, speed and power are defined. This may be achieved by running simulations offline and judging the operating points that can be achieved without the probability of exceeding an extreme load limit being greater than a pre-determined amount. A more advanced way would be to select the limits in terms of the current environmental conditions, for example, if the current wind conditions were high turbulence, the limits would be lower than if they were low turbulence. These conditions could be judged using a LiDAR unit, data from a MET mast, or turbine signals.

As described, the extent to which a given turbine overrates, may, in one aspect of the invention, vary according to the price the operator is paid for electricity at any given time, thus maximising the income from the investment. This aspect may be incorporated with lifetime usage estimation transmitting a measure of production importance with the power demand and using the measure to relax or restrict limits on rate of accumulation of fatigue or probability of extreme loads exceeding their design values. Forecasts of the weather based upon meteorological data may also be exploited to determine when over-rating could be most valuable over the prediction horizon.

As is clear from the foregoing description, the decision whether to overrate may be made by the turbine itself or by a centralised controller. When operating a set of turbines, it may be more prudent to compare the conditions of the various turbines to decide which ones should over-rate, by how much and in what way. This may be achieved in two separate ways. In the first implementation, the lifetime usage estimators and operational constraint controllers still exist on the individual turbines and these provide the centralized controller with constraints on torque, speed and power for each turbine in the plant. The centralized controller then performs an optimization to minimize the deviation of total power produced from the grid demand, and distribute the loads between the turbines in a manner matching their current state and the environmental conditions they are seeing (or expected to see). This optimization could also exploit information about the turbine locations and current wind direction in order to minimize the loads resulting from aerodynamic interaction.

In the second implementation, turbines are allowed to exchange information with a subset (or the whole set) of turbines in the power plant. The information exchanged would not be the components lifetimes used, rather a certificate relating to its current condition and ability to produce in the future. This would perform less well than the global optimal achieved in the first implementation but would have significantly reduced communication and computational demands. This system would mimic the way in which internet routers manage their transfer rate based upon the aggregate cost per communication link and the previous amount of data sent (TCP-IP).

The lifetime usage estimators will now be described in more detail. The algorithm required to estimate lifetime usage will vary from component to component and the lifetime usage estimators comprise a library of lifetime usage estimator algorithms including some or all of the following: load duration, load revolution distribution, rainflow counting, stress cycle damage, temperature cycle damage, generator thermal reaction rate, transformer thermal reaction rate and bearing wear. Additionally other algorithms may be used. As mentioned above, lifetime usage estimation may only be used for selected key components and the use of a library of algorithms enables a new component to be selected for LUE and the suitable algorithm selected from the library and specific parameters set for that component part.

In one embodiment, lifetime usage estimators are implemented for all major components of the turbine including the blade structure, the blade bearings and bolts, the blade pitch system, the main shaft and bearing system, the gearbox, the generator, the converter, the transformer, the yaw system, the tower and the foundation. In any implementation it may be decided to omit one or more of these components and/or to include further components.

As examples of the appropriate algorithms, rainflow counting may be used in the blade structure, blade bolts, pitch system, main shaft system, converter, yaw system, tower and foundation estimators. In the blade structure algorithm, the rainflow count is applied to the blade root bending flapwise and edgewise moment to identify the stress cycle range and mean values and the output is sent to the stress cycle damage algorithm. For the blade bolts, the rainflow count is applied to the bolt bending moment to identify stress cycle range and mean values and the output sent to the stress cycle damage algorithm. In the pitch system, main shaft system, tower and foundation estimators the rainflow counting algorithm is also applied to identify the stress cycle range and mean values and the output sent to the stress cycle damage algorithm. The parameters to which the rainflow algorithm is applied may include:

Pitch system—pitch force;
Main shaft system—main shaft torque;
Tower—tower stress;
Foundation—foundation stress.

In the yaw system the rainflow algorithm is applied to the tower top torsion to identity the load duration and this output is sent to the stress cycle damage algorithm. In the converter, generator power and RPM is used to infer the temperature and rainflow counting is used on this temperature to identify the temperature cycle and mean values. The output is then sent to the converter damage algorithm.

Lifetime usage in the blade bearings may be monitored either by inputting blade flapwise load and pitch velocity as inputs to the load duration algorithm or to a bearing wear algorithm. For the gearbox, the load revolution duration is applied to the main shaft torque to calculate the lifetime used. For the generator, generator RPM is used to infer generator temperature which is used as an input to the thermal reaction rate generator algorithm. For the transformer, the transformer temperature is inferred from the power and ambient temperature to provide an input to the transformer thermal reaction rate algorithm.

Where possible it is preferred to use existing sensors to provide the inputs on which the algorithms operate. Thus, for example, it is common for wind turbines to measure directly the blade root bending edgewise and flapwise moment required for the blade structure, blade bearing and blade bolts estimators. For the pitch system, the pressure in a first chamber of the cylinder may be measured and the pressure in a second chamber inferred, enabling pitch force to be calculated. These are examples only and other parameters required as inputs may be measured directly or inferred from other available sensor outputs. For some parameters, it may be advantageous to use additional sensors if a value cannot be inferred with sufficient accuracy.

The algorithms used for the various types of fatigue estimation are known and may be found in the following standards and texts:

Load Revolution Distribution and Load Duration:
Guidelines for the Certification of Wind Turbines, Germainischer Lloyd, Section 7.4.3.2 Fatigue Loads
Rainflow:
IEC 61400-1 'Wind turbines—Part 1: Design requirements, Annex G
Miners Summation:
IEC 61400-1 'Wind turbines—Part 1: Design requirements, Annex G
Power Law (Chemical Decay):
IEC 60076-12 'Power Transformers—Part 12: Loading guide for dry-type power transformers', Section 5

The frequency with which lifetime usage is calculated may vary. In one embodiment, the lifetime of a component that has been used is calculated every few minutes and expressed in years. The rate of lifetime usage may be calculated every minute. However, other time intervals may be used. The calculated values are provided to the turbine optimiser which therefore receives values for all major components every few minutes and usage rate values for all major components every minute.

The turbine optimizer is illustrated in FIG. 11. The turbine optimizer operates the turbine at a power level that does not exceed that sent by the PPC and outputs the optimal level of torque and speed based on information from the lifetime usage estimator and the OCC.

As can be seen from FIG. 11, the turbine optimiser 400 includes a set-point selector 410 and a fast constraint satisfaction unit 420. The set-point selector receives as its inputs the PPC demand, operational constraints from the OCC and the lifetime usage data for the major components as described above. In the FIG. 11 example the input is the absolute value of lifetime usage rather than the rate of usage. The set-point selector outputs optimal set-points to the fast constraint satisfactions unit periodically, for example between every minute and every few minutes. The fast constraint satisfaction unit 420 also receives as inputs the PCC demand signal, the lifetime usage date and the operating constraints and outputs speed and torque set points periodically. In the example shown, set-points are output at the frequency of demand signals received from the PPC.

Of the components for which lifetime usage is determined, each will be classified as speed sensitive if the damage accumulated correlates with speed overrating percentage only and torque sensitive if the damage accumulated correlates with the torque over-rating percentage only. Components may be generic is they are sensitive to both torque and speed.

As mentioned, the set point selector 410 chooses the optimal speed and torque set-points. This is done on a slow time scale Ts which is in the order of minutes. The Set-Point Selector update rate Ts, is chosen to maximise performance whilst ensuring the Over-rating controller does not interfere with existing controllers in the turbine software.

The set-point selector 410 receives the lifetime usage estimates for all estimated components and selects the value corresponding to the most damaged component; that with the greatest used life. If that component has consumed more of its fatigue life than it has been designed to have used at that point in time (the Set-Point Selector outputs Optimal speed and power Set-Points equal to their respective rated values. Thus, in that circumstance there is no overrating. This is illustrated in FIG. 12 which shows the design fatigue level as a straight line graph of time, measured from installation to decommission dates, against lifetime usage estimate. In the figure the accumulated fatigue at a time 'today' is greater than the design level and so no overrating would be permitted. FIG. 12 is schematic only and a straight line graph may not reflect the desired accumulation of lifetime and the rate of usage will depend on the season.

If any of the speed sensitive components have used more of their fatigue lives than their design value at that point in time, the Set-point selector outputs an Optimal speed Set-point equal to rated speed and if any of the torque sensitive components have used more of their fatigue lives than their design value at that point in time, the Set-point selector outputs an Optimal torque Set-point equal to rated torque. The Set-Point Selector chooses an Optimal Set-Point to maximise the power produced subject to constraints from the PPC and Operational Constraint Controllers sampled at the beginning of the time-step. The Set-Point Selector also attempts to equalize the damage to the most damaged speed and torque sensitive components.

The Fast constraint satisfaction unit in this example operates at a higher frequency than the set-point selector and applies saturations to the optimal speed and torque Set-Points, limiting the outputs to the limits provided by the Operational Constraint Controllers and PPC.

The Fast constraint satisfaction block does not allow the Turbine Optimiser to send set-points over-rated by speed/torque if any of the speed/torque sensitive components have consumed more than their target life. Similarly, the Turbine Optimiser will not send an over-rated power set-point if any of the generic components have consumed more than their target life.

The embodiments described contemplate overrating based on torque and speed. Overrating may also be used in constant speed turbines, for example constant speed active stall turbines. In this case, only the power signal is overrated and each turbine in the power plant, or each turbine in a subset of the power plant, sends an overrating demand to the PPC which monitors the total output and reduces the amount of overrating if the total output is above the rated output of the power plant. Alternatively only the power signal may be overrated. In practice, this is likely to be rarely necessary as, dependent on weather conditions, not all turbines will be overrating and some may not be generating any power, for example as they are shut down for maintenance. Alternatively, a power regulation model uses a control loop which compares wind speed input data from each turbine to known power curves to predict how much power each turbine can produce at any given time.

The PRM sends individual power demands to each turbine with the objective to obtain as close to power plant rated power as possible. The PRM may be used with an extended power curve for an over-rated turbine.

Embodiments of the invention enable the use of over-rating at suitable times to lower the cost of energy. Within a wind power plant, over-rating may be used selectively taking into account variations in wind and site conditions across the wind park, variations in rates of component wear and tear, turbine shut-downs for maintenance or faults and variations in the price of electricity. As turbine components fatigue at different rates in different conditions, the actual lifetime of some components may be considerably more than the 20 year expected lifetime for a wind turbine. In a given set of conditions, the components that are closest to their aggregate lifetime limit could have a low instantaneous fatigue rate. As other components have a longer lifetime as these are not driving the overall turbine life, the turbine has spare production capacity. In addition, different turbines in the power plant will experience different conditions over their life.

Thus any turbine may be overrated, if the conditions allow it, to maximise energy output while maintaining the turbine lifetime. This is illustrated by FIG. 10a)-d). FIG. 10a) shows the total lifetime fatigue of various components. Component 5 is the most critical, defining its 20 year life. FIG. 10b) shows an example of conditions where the instantaneous fatigue rate of component 5 is lower that its 20 year average and that of component 7 is greater than its average. FIG. 10c) shows that under these conditions the turbine can be over-rated, bringing component 2, which is now the one with the highest fatigue rate, up to its 20 year limit. FIG. 10d) shows that the turbine can be over-rated even more if component 2 is allowed to fatigue at a rate that is higher than its lifetime limit. At this level of over-rating the component would fail before the end of its 20 year lifetime but this is not a problem for short periods of time as the component has lifetime total fatigue to spare. This maximal over-rating is therefore limited by accumulated fatigue rather than instantaneous fatigue. In this case, component 7 does not have spare lifetime capacity and so does not pass its 20 year limit. Thus, the turbines can reduce the variability of the power plant output by acting as a group.

Many alternatives to the embodiments described are possible and will occur to those skilled in the art without departing from the scope of the invention which is defined by the following claims.

The invention claimed is:

1. A controller for a wind turbine power plant comprising a plurality of wind turbines each having a rated output, the controller comprising:
an over-rating calculation unit for configured to determine and send to two or more of the plurality of wind turbines an over-rating request signal indicating an amount up to which the two or more wind turbines are to over-rate their output above their rated output.

2. A controller according to claim 1, wherein the over-rating request signal is based on a difference signal formed from the rated output of the power plant less the measured output of the power plant.

3. A controller according to claim 2, further comprising an integrator for integrating the difference signal; and
an amplifier for applying a gain to amplify the integrated difference signal, the amplified integrated difference signal being provided to the controller to determine the over-rating request signal.

4. A controller according to claim 3, wherein the gain applied by the amplifier is inversely proportional to a ratio of change in over-rating set point to power plant output change, the ratio being provided from the plurality of wind turbines.

5. A controller according to claim 3, wherein the gain of the amplifier is dependent on a delay in signaling between the controller and individual wind turbines.

6. A controller according to claim 1, wherein an individual over-rating request signal is calculated for one or more of the plurality of wind turbines based on an individual over-rating capability provided to the controller by the plurality of wind turbines.

7. A controller according to claim 2, wherein the over-rating request signal provided to each turbine from the controller is processed by each wind turbine to account for turbine fatigue.

8. A controller according to claim 7, wherein the turbine fatigue includes a fatigue of one or more critical turbine components with respect to rotational speed and/or torque.

9. A controller according to claim 7, wherein the processing of the over-rating request signal provides an output which over-rates the wind turbine by an amount less than the over-rating request signal.

10. A controller according to claim 7, wherein the over-rating request signal received from the controller is processed according to a response function based on slope or offset control.

11. A controller according to claim 1, comprising a turbine optimiser for calculating at least one of power, rotational speed, and torque set points for each wind turbine based on the over-rating request signal and defined maximum and minimum values of power, rotational speed, and torque, respectively.

12. A controller according to claim 11, wherein the over-rating request signal comprises a power set point, and
wherein, upon determining the power set point is outside an area bounded by the maximum and minimum values of rotational speed and torque, the rotational speed and torque set points are set to the corresponding maximum or minimum values.

13. A controller according to claim 11, wherein the turbine optimiser includes soft constraint values for drive train related parameters and generator speed, and
wherein, upon determining that a measured value is approaching a soft constraint value, the over-rating signal is reduced.

14. A controller according to claim 11, wherein the two or more wind turbines are constant speed turbines, and the turbine optimiser calculates a power set point.

15. A wind turbine power plant, comprising:
a plurality of wind turbines each having a rated power output; and
a controller communicatively coupled to the plurality of wind turbines, the controller comprising an over-rating calculation unit that is configured to calculate and send to two or more of the plurality of wind turbines an over-rating request signal indicating an amount up to which the two or more wind turbines are to over-rate their power output above their rated power output.

16. A wind turbine power plant according to claim 15, wherein at least a subset of the plurality of wind turbines are configured to exchange information via the controller regarding their ability to generate power.

17. A wind turbine power plant according to claim 16, wherein the information is exchanged in the form of a certificate sent by a wind turbine of the subset to other wind turbines of the subset.

18. A wind turbine power plant according to claim 15, further comprising a turbine optimiser for calculating at least one of power, speed, and torque set points for each wind turbine based on the over-rating request signal and defined maximum and minimum values of power, rotational speed, and torque, respectively, wherein the turbine optimiser is a central optimiser which calculates speed and torque set points for a plurality of wind turbines.

19. A wind turbine power plant according to claim 15, further comprising a turbine optimiser for calculating at least one of power, speed, and torque set points for each wind turbine based on the over-rating request signal and defined maximum and minimum values of power, rotational speed, and torque, respectively, wherein the turbine optimiser is an individual turbine optimiser which calculates speed and torque set points for an individual wind turbine.

20. A method of controlling a wind turbine power plant, comprising a plurality of wind turbines each having a rated output, the method comprising:
    determining an over-rating request signal indicating an amount up to which two or more of the plurality of wind turbines are to over-rate their output above rated output; and
    sending the over-rating request signal to each of the two or more wind turbines.

21. A method according to claim 20, wherein determining the over-rating request signal is based on a difference between the rated output of the power plant and the measured output of the power plant.

22. A method according to claim 21, wherein determining the over-rating request signal comprises integrating the difference signal, amplifying the integrated signal by applying a gain, and determining the over-rating request signal from the amplified integrated difference signal.

23. A method according to claim 22, further comprising:
    receiving from the wind turbines a signal indicative of a ratio of change in over-rating set point to power plant output change; and
    setting the gain in inverse proportion to the received ratio.

24. A method according to claim 22, wherein the gain is dependent on a delay in signaling between the controller and individual wind turbines.

25. A method according to claim 20, wherein determining the over-rating request signal comprises determining an individual over-rating request signal for each of the two or more wind turbines based on an individual over-rating capability signal provided by each of the two or more wind turbines.

26. A method according to claim 20, further comprising processing the sent over-rating request signal to account for turbine fatigue.

27. A method according to claim 26, wherein the turbine fatigue includes a fatigue of one or more critical turbine components with respect to rotational speed and/or torque.

28. A method according to claim 26, wherein the processing of the sent over-rating request signal provides an output which over-rates the wind turbine by an amount less than the over-rating request signal.

29. A method according to claim 26, wherein the sent over-rating request signal is processed according to a response function based on slope or offset control.

30. A method according to claim 20; further comprising calculating at least one of power, rotational speed, and torque set points for each wind turbine based on the over-rating request signal and defined maximum and minimum values of power, rotational speed, and torque, respectively.

31. A method according to claim 30, wherein the over-rating request signal comprises a power set point, and
    wherein, upon determining the power set point is outside an area bounded by the maximum and minimum values of rotational speed and torque, the rotational speed and torque set points are set to the corresponding maximum or minimum values.

32. A method according to claim 30, wherein the turbines to be controlled are constant speed turbines, and further comprising calculating a power set point.

* * * * *